United States Patent
Oguri

[19]

[11] Patent Number: 6,161,010
[45] Date of Patent: Dec. 12, 2000

[54] FAULT MONITORING APPARATUS FOR MOBILE COMMUNICATION SYSTEM

[75] Inventor: Naoki Oguri, Nagoya, Japan

[73] Assignee: Fujitsu Limited, Kawasaki, Japan

[21] Appl. No.: 09/160,700

[22] Filed: Sep. 25, 1998

[30] Foreign Application Priority Data

Mar. 11, 1998 [JP] Japan ................................... 10-059359

[51] Int. Cl.[7] .................................................. H04Q 7/20
[52] U.S. Cl. .......................... 455/423; 455/405; 455/424; 455/67.1; 455/67.4
[58] Field of Search .................................... 455/422, 423, 455/424, 67.4, 67.1, 115, 515, 405

[56] References Cited

U.S. PATENT DOCUMENTS

| | | | |
|---|---|---|---|
| 5,023,900 | 6/1991 | Tayloe et al. | 379/32 |
| 5,357,557 | 10/1994 | Sakakura | 379/27 |
| 5,469,494 | 11/1995 | Perez et al. | 379/27 |
| 5,913,162 | 6/1999 | Gourdin et al. | 455/424 |
| 5,923,247 | 7/1999 | Dowden et al. | 340/506 |
| 5,940,471 | 8/1999 | Homayoun | 379/1 |
| 5,943,617 | 8/1999 | Nakamura | 455/423 |
| 6,021,315 | 2/2000 | Telewski | 455/67.1 |

FOREIGN PATENT DOCUMENTS

57-178441  11/1982  Japan .
61-156931   7/1986  Japan .

*Primary Examiner*—Dwayne D. Bost
*Assistant Examiner*—Sonny Trinh
*Attorney, Agent, or Firm*—Helfgott & Karas, P.C.

[57] ABSTRACT

A fault monitoring apparatus for a mobile communication system is capable of quickly detecting a fault and will prevent a radio wave level measurement test from being carried out unnecessarily. A call loss information collecting unit detects the numbers of outgoing and incoming calls and the numbers of base-station-disconnected calls in respective components of base stations, and accumulates and stores the detected numbers in corresponding memory areas of a call loss information table. A test region determining unit reads the accumulated numbers of outgoing and incoming calls and the accumulated numbers of base-station-disconnected calls from the call loss information table, and calculates call loss probabilities in the respective components. The test region determining unit also specifies a component of the base stations which is to be automatically tested for fault detection, based on the calculated call loss probabilities. An automatic testing unit automatically tests the component of the base stations which has been specified, for fault detection. A result judging and notifying unit judges whether there is a fault or not based on a test result produced by the automatic testing unit, and notifies maintenance personnel of a faulty location.

27 Claims, 8 Drawing Sheets

FAULT MONITORING APPARATUS FOR MOBILE COMMUNICATION SYSTEM

BACKGROUND OF THE INVENTION (1) Field of the Invention

The present invention relates to a fault monitoring apparatus for a mobile communication system, and more particularly to a fault monitoring apparatus for a mobile communication system based on the standards of the Research & Development Center for Radio System (RCR).

(2) Description of the Related Art

Generally, mobile communication systems are made up of a single mobile switching center (MSC), hundreds of base stations (BS) connected to the mobile switching center via wired transmission paths, and mobile stations (MS) positioned in radio service zones of the base stations and connected to the base stations via radio transmission paths. A base station control equipment (BCE) is connected to the mobile switching center.

Heretofore, it has been customary for the maintenance personnel to monitor the base stations through the base station control equipment to detect faults that may occur in the base stations.

Specifically, the maintenance personnel refer to call processing alarms which the base station control equipment collects from the base stations through the mobile switching center at all times, and recognize the occurrence of a fault when the content of an indicated reason of any one of the call processing alarms represents either one of time-out of a response to a channel allocation request, time-out of a response to a reception level measurement request, and time-out of a response to a radio channel designation request. The maintenance personnel designates the transceiver (TRX) of a base station where a fault is possibly occurring, and conducts a radio wave level measurement test on the controller of the base station.

In the radio wave level measurement test, radio waves in respective channels are transmitted and received between the designated transceiver of the base station and a test transceiver (TTR) in the base station via the radio transmission path. The designated transceiver and the test transceiver measure received levels in frequency bands of the respective channels and adjacent frequency bands, and send the measured values to the maintenance personnel. The maintenance personnel then specify a faulty channel and a faulty device based on the measured values.

According to the conventional base station monitoring practice, the maintenance personnel refer to call processing alarms, detect the occurrence of a fault in a base station, and conduct a radio wave level measurement test.

However, the manual fault detection process is disadvantageous in that the maintenance personnel may not necessarily start an immediate fault detection procedure, and it may take too a long period of time before a fault is detected if the maintenance personnel conduct a fault detection procedure only several times a day.

As described above, the occurrence of a fault in a base station has heretofore been detected on the basis of call processing alarms. Since the detection process based on call processing alarms tends to detect cases other than true faults in base stations, however, a radio wave level measurement test may possibly be conducted on cases which do not require such a test.

SUMMARY OF THE INVENTION

It is therefore an object of the present invention to provide a fault monitoring apparatus for a mobile communication system, which is capable of quickly detecting a fault and will prevent a radio wave level measurement test from being carried out unnecessarily.

To achieve the above object, there is provided in accordance with the present invention a fault monitoring apparatus for a mobile communication system having a plurality of base stations, a mobile switching center, and a base station control equipment. The fault monitoring apparatus comprises a call loss information table disposed in the mobile switching center and having a plurality of memory areas corresponding respectively to a plurality of components of the base stations, call loss information collecting means disposed in the mobile switching center, for detecting the numbers of outgoing and incoming calls and the numbers of base-station-disconnected calls in the respective components based on outgoing and incoming call signals sent from the base stations, and accumulating and storing the detected numbers in the corresponding memory areas of the call loss information table, test region determining means disposed in the mobile switching center, for calculating call loss probabilities in the respective components based on the accumulated numbers of outgoing and incoming calls and the accumulated numbers of base-station-disconnected calls, which have been stored in the call loss information table, and specifying a component of the base stations which is to be automatically tested for fault detection, based on the calculated call loss probabilities, automatic testing means disposed in the mobile switching center, for automatically testing the component of the base stations which has been specified by the test region determining means, for fault detection, and result judging and notifying means disposed in the mobile switching center, for judging whether there is a fault or not based on a test result produced by the automatic testing means, and notifying maintenance personnel of a faulty location if there is a fault as judged by the result judging and notifying means.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of a fault monitoring apparatus according to a first embodiment of the present invention will first be described below with reference to FIG. 1.

Figure 1:
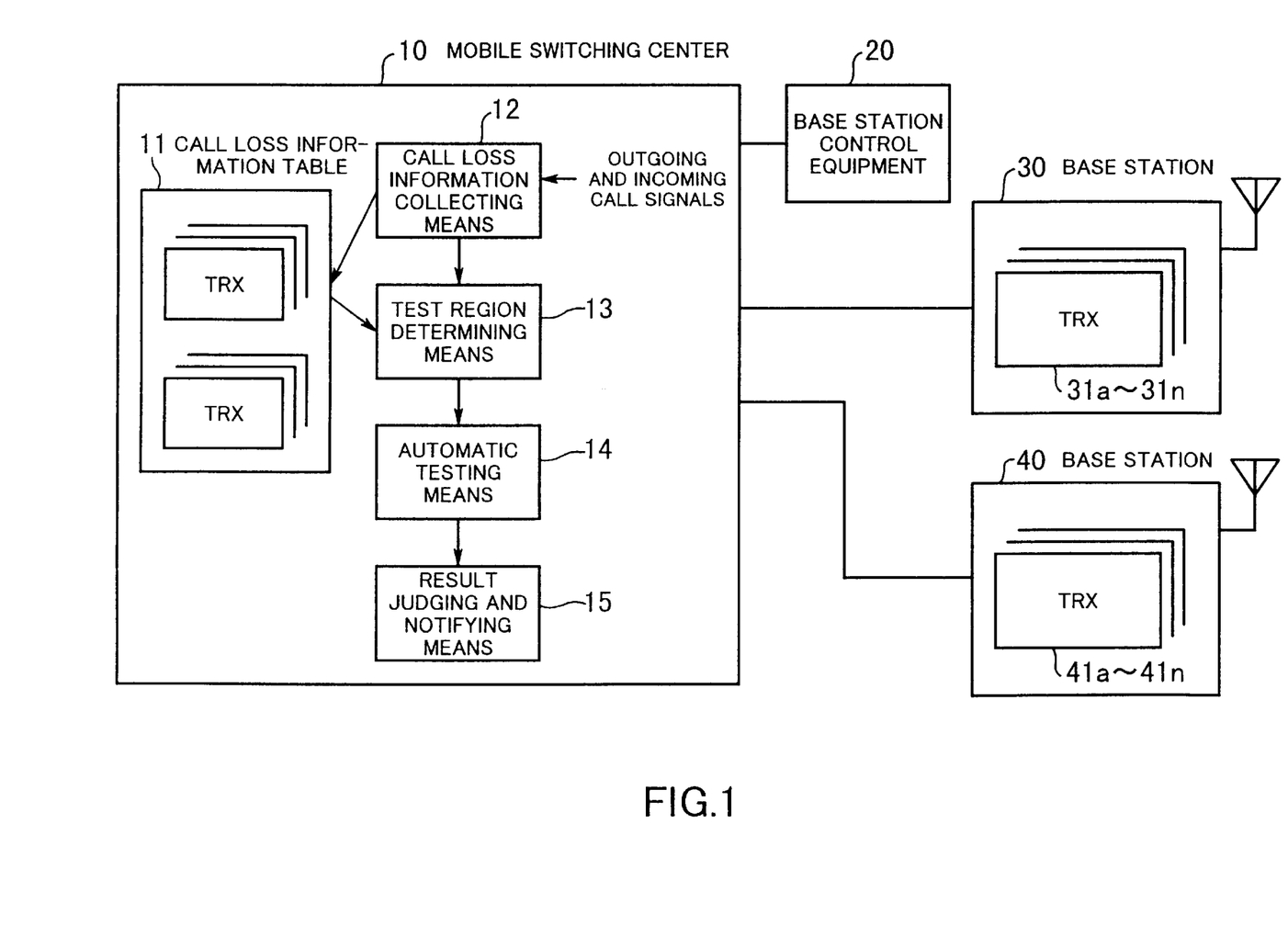
FIG. 1 is a block diagram illustrating the principles of a fault monitoring apparatus according to a first embodiment of the present invention.

As shown in FIG. 1, the fault monitoring apparatus comprises a call loss information table 11 disposed in a mobile switching center 10 and having a plurality of memory areas corresponding respectively to a plurality of components 31a–31n, 41a–41n of base stations 30, 40, a call loss information collecting means 12 disposed in the mobile switching center 10, for detecting the numbers of outgoing and incoming calls and the numbers of base-station-disconnected calls in the respective components 31a–31n, 41a–41n based on outgoing and incoming call signals sent from the base stations 30, 40, and accumulating and storing the detected numbers in the corresponding memory areas of the call loss information table 11, a test region determining means 13 disposed in the mobile switching center 10, for calculating call loss probabilities in the respective components 31a–31n, 41a–41n based on the accumulated numbers of outgoing and incoming calls and the accumulated numbers of base-station-disconnected calls, which are stored in the call loss information table 11, and specifying a component of the base stations 30, 40 which is to be automatically tested for fault detection, based on the calculated call loss probabilities, an automatic testing means 14 disposed in the mobile switching center 10, for automatically testing the component of the base stations 30, 40 which is specified by the test region determining means 13, for fault detection, and a result judging and notifying means 15 disposed in the mobile switching center 10, for judging whether there is a fault or not based on a test result produced by the automatic testing means 14, and notifying maintenance personnel of a faulty location if there is a fault as judged by the result judging and notifying means 15.

The components 31a–31n, 41a–41n of the base stations 30, 40 may, for example, comprise a plurality of respective transceivers (TRX) of the base stations 30, 40. The numbers of outgoing and incoming calls detected by the call loss information collecting means 12 are specifically the numbers of received outgoing radio status report messages and received incoming radio status report messages which are contained in the outgoing and incoming call signals. The numbers of base-station-disconnected calls detected by the call loss information collecting means 12 are specifically the numbers of received call disconnected event messages which carry reasons for base-station-disconnected calls, among call disconnected event messages which are contained in the outgoing and incoming call signals.

The fault monitoring apparatus shown in FIG. 1 operates as follows: First, a plurality of memory areas corresponding respectively to the components 31a–31n of the base station 30 are established in the call loss information table 11, and a plurality of memory areas corresponding respectively to the components 41a–41n of the base station 40 are established in the call loss information table 11.

The call loss information collecting means 12 detects the numbers of outgoing and incoming calls and the numbers of base-station-disconnected calls in the respective components 31a–31n, 41a–41n based on outgoing and incoming call signals sent from the base stations 30, 40, and accumulates and stores the detected numbers in the corresponding memory areas of the call loss information table 11.

Each time a predetermined period of time, e.g., 15 minutes, elapses, the test region determining means 13 reads all the accumulated numbers of outgoing and incoming calls and of base-station-disconnected calls from the memory areas of the call loss information table 11. After having read the accumulated numbers, the test region determining means 13 clears all the memory areas of the call loss information table 11. As a result, the read accumulated numbers are limited to the predetermined period of time. Then, the test region determining means 13 calculates call loss probabilities in the respective components 31a–31n, 41a–41n based on the accumulated numbers of outgoing and incoming calls and the accumulated numbers of base-station-disconnected calls, which have been read. The call loss probabilities are values produced by dividing the accumulated numbers of base-station-disconnected calls in the predetermined period of time by the accumulated numbers of outgoing and incoming calls in the predetermined period of time, in the respective components 31a–31n, 41a–41n.

If any one of the calculated call loss probabilities exceeds a predetermined reference value, then the test region determining means 13 specifies a component of the base stations 30, 40 which is related to the excessive call loss probability as a component which is to be automatically tested for fault detection.

The automatic testing means 14 automatically tests the component which is specified by the test region determining means 13, for fault detection. The result judging and notifying means 15 judges whether there is a fault or not based on a test result produced by the automatic testing means 14, and notifies maintenance personnel of a faulty location if there is a fault as judged by the result judging and notifying means 15.

Since the occurrence of a fault is detected automatically, but not manually, the detection of the occurrence of a fault can immediately be carried out.

Furthermore, since the occurrence of a fault in a base station is detected on the basis of a call loss probability, a radio wave level measurement test is prevented from being carried out on cases which do not require such a test.

The fault monitoring apparatus according to the first embodiment of the present invention will be described in greater detail below. In the first embodiment described below, the call loss information collecting means 12 shown in FIG. 1 corresponds to a call loss information collecting unit 12a shown in FIG. 3, the test region determining means 13 shown in FIG. 1 to a test TRX determining unit 13a shown in FIG. 3, the automatic testing means 14 shown in FIG. 1 to an automatic testing unit 14a shown in FIG. 3, and the result judging and notifying means 15 shown in FIG. 1 to a result judging and notifying unit 15a shown in FIG. 3.

Figure 2:
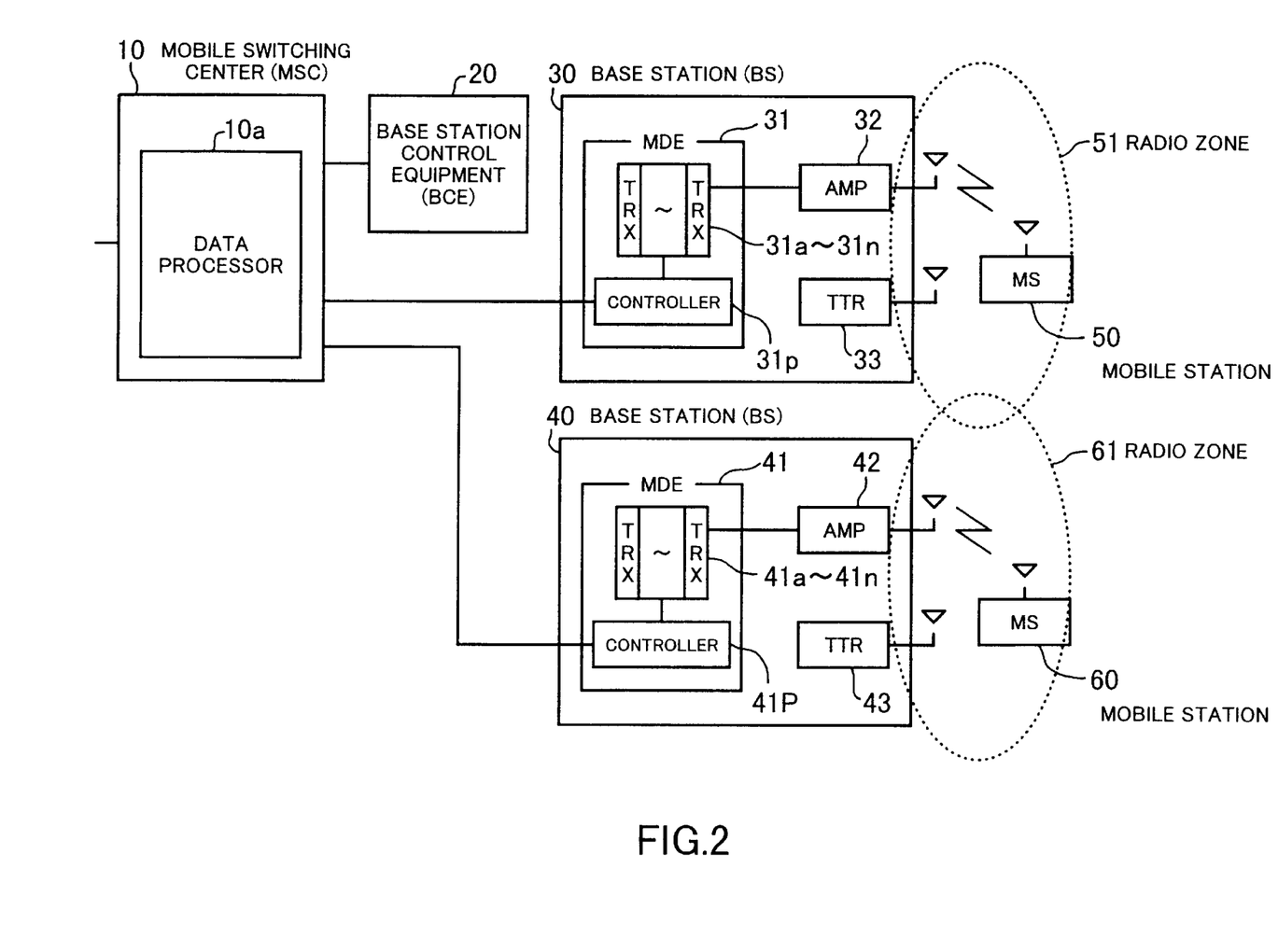
FIG. 2 is a block diagram of a mobile communication system which incorporates the fault monitoring apparatus according to the first embodiment of the present invention.

FIG. 2 shows in block form a mobile communication system which incorporates the fault monitoring apparatus according to the first embodiment of the present invention.

As shown in FIG. 2, base stations (BS) 30, 40 are connected to a mobile switching center (MSC) 10, and a base station control equipment (BCE) 20 is connected to the mobile switching center 10. A mobile station (MS) 50, for example, is positioned in a radio zone 51 covered by the base station 30, and is connected to the base station 30 via a radio link. Similarly, a mobile station (MS) 60, for example, is positioned in a radio zone 61 covered by the base station 40, and is connected to the base station 40 via a radio link. A public network (not shown) is connected to the mobile switching center 10.

The mobile switching center 10 has therein a data processor 10a comprising a CPU, a RAM, a ROM, an I/O, etc. The data processor 10a carries out processing operations to perform the various means shown in FIG. 1. The processing operations carried out by the data processor 10a will be described later on with reference to FIG. 3. The base station control equipment 20 also has a data processor (not shown) comprising a CPU, a RAM, a ROM, an I/O, etc.

The base station 30 comprises a mobile data equipment (MDE) 31, a radio amplifier (AMP) 32, and a test transceiver (TTR) 33. The mobile data equipment 31 comprises a plurality of transceivers (TRX) 31a–31n and a controller 31p. In the base station 30, a service zone covered thereby is divided into three sectors, for example, with a directional antenna. A radio zone 51 corresponds to one of those sectors. 24 transceivers are associated with each of the sectors. Therefore, there are 72 transceivers 31a–31n, and three channels are assigned to each of the transceivers 31a–31n, with two channels as traffic channels (TCH) and one channel as a control channel (CCH). Alternatively, 16 transceivers may be associated with each of the sectors. In this case, there are 48 transceivers 31a–31n, and six channels are assigned to each of the transceivers 31a–31n, with five channels as traffic channels (TCH) and one channel as a control channel (CCH).

The base station 40 is identical in structure to the base station 30, and will not be described in detail.

Figure 3:
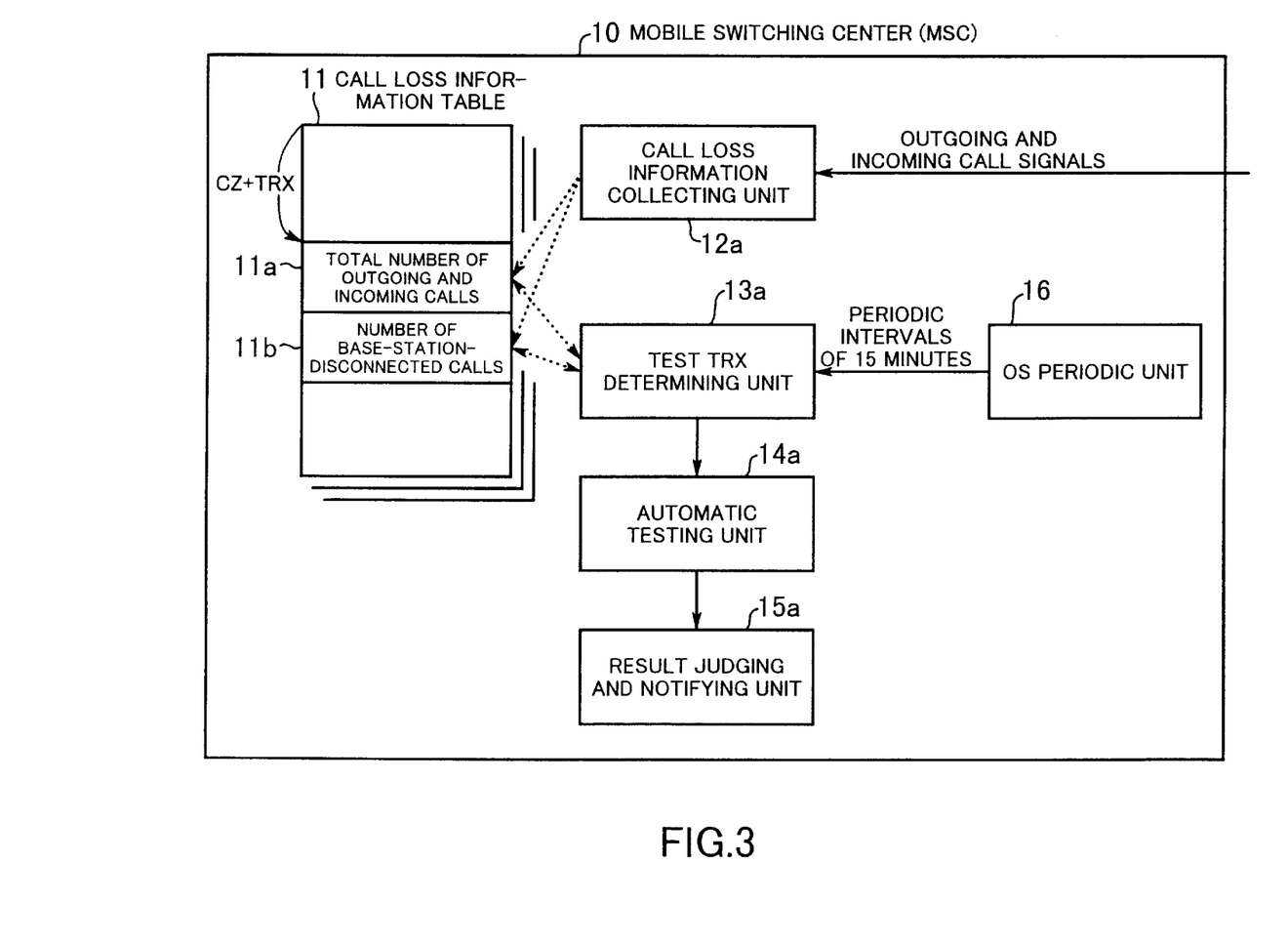
FIG. 3 is a block diagram of functions performed by the processing operation of a data processor of a mobile switching center shown in FIG. 2.

FIG. 3 shows in block form functions performed by the processing operation of the data processor 10a of the mobile switching center 10 shown in FIG. 2. In FIG. 3, the call loss information table 11 has divided memory areas corresponding respectively to the base stations. Each of the memory areas includes divided memory areas associated respectively with radio zones (CZ) and transceivers (TRX) and each having a column 11a for storing data representing the total number of outgoing and incoming calls and a column 11b for storing data representing the number of base-station-disconnected calls.

It is assumed that the base station 30 requests a call to the base station 40, and the base stations 30, 40 are normally connected to each other. According to the standards of RCR, the calling base station 30 outputs an "outgoing radio status report" message to the base station control equipment 20, and the called base station 40 outputs an "incoming radio status report" message to the base station control equipment 20. If the base stations 30, 40 are not normally connected to each other, but are disconnected from each other, the base station 30 outputs a "call disconnected event" message to the base station control equipment 20 in case the call disconnection is an outgoing call disconnection, or the base station 40 outputs a "call disconnected event" message to the base station control equipment 20 in case the call disconnection is an incoming call disconnection. Each message contains information representing the name of the base station and the name of the transceiver which are related to the message.

The call loss information collecting unit 12a writes data into the call loss information table 11 based on the message included in an outgoing signal or an incoming signal applied to the mobile switching center 10.

Specifically, when the call loss information collecting unit 12a has received an "outgoing radio status report" message or an "incoming radio status report" message, the call loss information collecting unit 12a searches the call loss information table 11 for a memory area which stores the name of the base station and the name of the transceiver that are indicated by the message, and increments, by 1, the value already stored in the column 11a in the located memory area.

When the call loss information collecting unit 12a has received an "call disconnected event" message, the call loss information collecting unit 12a refers to an indicated reason contained in the message. Only when the indicated reason describes a reason for a base-station-disconnected call, the call loss information collecting unit 12a searches the call loss information table 11 for a memory area which stores the name of the base station and the name of the transceiver that are indicated by the message, and increments the value already stored in the column 11b in the located memory area. Reasons for a base-station-disconnected call include "temporary fault", requested channel unavailability, and "recovery due to timer elapse" as stipulated by RCR standard STD-27E. The reason "temporary fault" is caused when synchronizing color codes do no match over a predetermined period of time. The reason "requested channel unavailability" is brought about when a transceiver suffers a fault. The reason "recovery due to timer elapse" occurs with respect to time-out of a response to a level measurement request.

An OS periodic unit 16 starts to operate the test TRX determining unit 13a at a periodic interval of 15 minutes, for example. When the test TRX determining unit 13a starts to operate, it reads data from all the memory areas of the call loss information table 11, and then updates all the memory areas with the value 0. As a result, the data read from the memory areas represents the accumulated numbers, over 15 minutes, of outgoing and incoming calls and base-station-disconnected calls in the respective transceivers of the base stations.

Using the read data, the test TRX determining unit 13a calculates call loss probabilities in the respective transceivers of the base stations by dividing the values in the columns 11b by the values in the columns 11a associated with the respective transceivers of the base stations.

The test TRX determining unit 13a compares the calculated call loss probabilities in the respective transceivers of the base stations with a predetermined reference value. If any one of the calculated call loss probabilities exceeds the predetermined reference value, then test TRX determining unit 13a designates the transceiver of the base station which is related to the excessive call loss probability, and starts to operate the automatic testing unit 14a. Therefore, the test TRX determining unit 13a monitors the call loss probability of each of the transceivers of the base stations at a periodic interval of 15 minutes, for example, and when the monitored call loss probability exceeds the predetermined reference value, the test TRX determining unit 13a determines that a region related to the corresponding transceiver is possibly suffering a fault. It is assumed that a region related to the transceiver 31a of the base station 30 is possibly suffering a fault.

When the automatic testing unit 14a starts to operate, it issues a command to the controller 31p of the base station 30 in question to cause the designated transceiver 31a and the test transceiver 33 to transmit and receive radio waves in respective channels via the radio transmission path. The automatic testing unit 14a also causes the designated transceiver 31a and the test transceiver 33 to measure received levels in the frequency bands of the respective channels and both frequency side bands adjacent to the frequency bands.

The result judging and notifying unit 15a receives the measured results and specifies a faulty location. Specifically, if the received level in the frequency band of a first channel is equal to or lower than a first predetermined level, or the received levels in the both frequency side bands adjacent to the frequency band of the first channel are equal to or higher than a second predetermined level (considerably smaller than the first predetermined level), then the result judging and notifying unit 15a determines that a region related to the first channel in the transceiver 31a of the base station 30 is suffering a fault. The result judging and notifying unit 15a makes such a judgment with respect to each of the received levels measured by the designated transceiver 31a and the test transceiver 33, and also with respect to each of the channels.

If the result judging and notifying unit 15a determines the occurrence of a fault, then the result judging and notifying unit 15a notifies the maintenance personnel of the fault through the base station control equipment 20.

According to the first embodiment, since the occurrence of a fault is detected automatically, but not manually, the detection of the occurrence of a fault can immediately be carried out.

According to the first embodiment, furthermore, since the occurrence of a fault in a base station is detected on the basis of a call loss probability, a radio wave level measurement test is prevented from being carried out on cases which do not require such a test.

A fault monitoring apparatus according to a second embodiment of the present invention will be described below. The arrangement of the fault monitoring apparatus according to the second embodiment is basically similar to the arrangement of the fault monitoring apparatus according to the first embodiment shown in FIG. 2. Therefore, the description of the arrangement of the fault monitoring apparatus according to the first embodiment will be incorporated herein.

The processing operation of the data processor 10a of the mobile switching center 10 and the processing operation of the data processor of the base station control equipment 20 according to the second embodiment are different from those according to the first embodiment.

Figure 4:
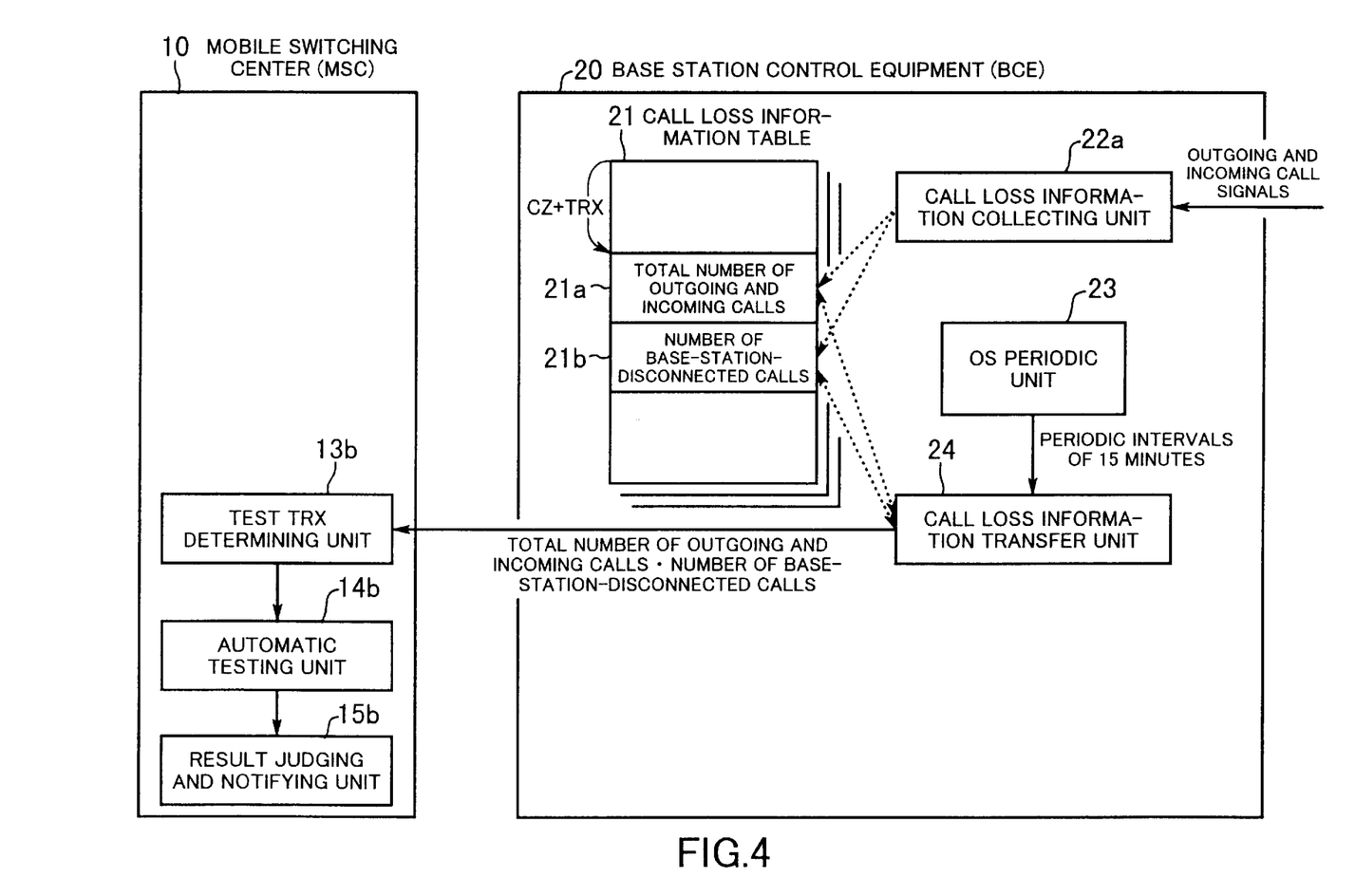
FIG. 4 is a block diagram of functions performed by the processing operation of a data processor of a mobile switching center and the processing operation of a data processor of a base station control equipment in a fault monitoring apparatus according to a second embodiment of the present invention.

FIG. 4 shows in block form functions performed by the processing operation of the data processor 10a of the mobile switching center 10 and the processing operation of the data processor of the base station control equipment 20 in the fault monitoring apparatus according to the second embodiment of the present invention.

In FIG. 4, a call loss information table 21 is identical to the call loss information table 11 according to the first embodiment except that the call loss information table 21 is disposed in the base station control equipment 20. A call loss information collecting unit 22a is also identical to the call loss information collecting unit 12a according to the first embodiment except that the call loss information collecting unit 22a is disposed in the base station control equipment 20. Therefore, the call loss information table 21 and the call loss information collecting unit 22a will not be described in detail below.

In the base station control equipment 20, an OS periodic unit 23 starts to operate a call loss information transfer unit 24 at a periodic interval of 15 minutes, for example. When the call loss information transfer unit 24 starts to operate, it reads data from all the memory areas of the call loss information table 21, and then updates all the memory areas with the value 0. As a result, the data read from the memory areas represents the accumulated numbers, over 15 minutes, of outgoing and incoming calls and base-station-disconnected calls in the respective transceivers of the base stations.

The call loss information transfer unit 24 transfers the read accumulated numbers to a test TRX determining unit 13b in the mobile switching center 10.

Using the read data, the test TRX determining unit 13b calculates call loss probabilities in the respective transceivers of the base stations. The test TRX determining unit 13b calculates the call loss probabilities and carries out a subsequent comparing and determining process to start to operate an automatic testing unit 14b in the same manner as with the test TRX determining unit 13a according to the first embodiment.

The automatic testing unit 14b and a result judging and notifying unit 15b operate in the same manner as with the automatic testing unit 14a and the result judging and notifying unit 15a according to the first embodiment.

According to the second embodiment, the burden on the mobile switching center 10 for its processing operations is smaller than the burden on the mobile switching center 10 according to the first embodiment.

A fault monitoring apparatus according to a third embodiment of the present invention will be described below. The arrangement of the fault monitoring apparatus according to the third embodiment is basically similar to the arrangement of the fault monitoring apparatus according to the first embodiment shown in FIG. 2. Therefore, the description of the arrangement of the fault monitoring apparatus according to the first embodiment will be incorporated herein.

The processing operation of the data processor 10a of the mobile switching center 10 and the processing operation of the data processor of the base station control equipment 20 according to the third embodiment are different from those according to the first embodiment.

Figure 5:
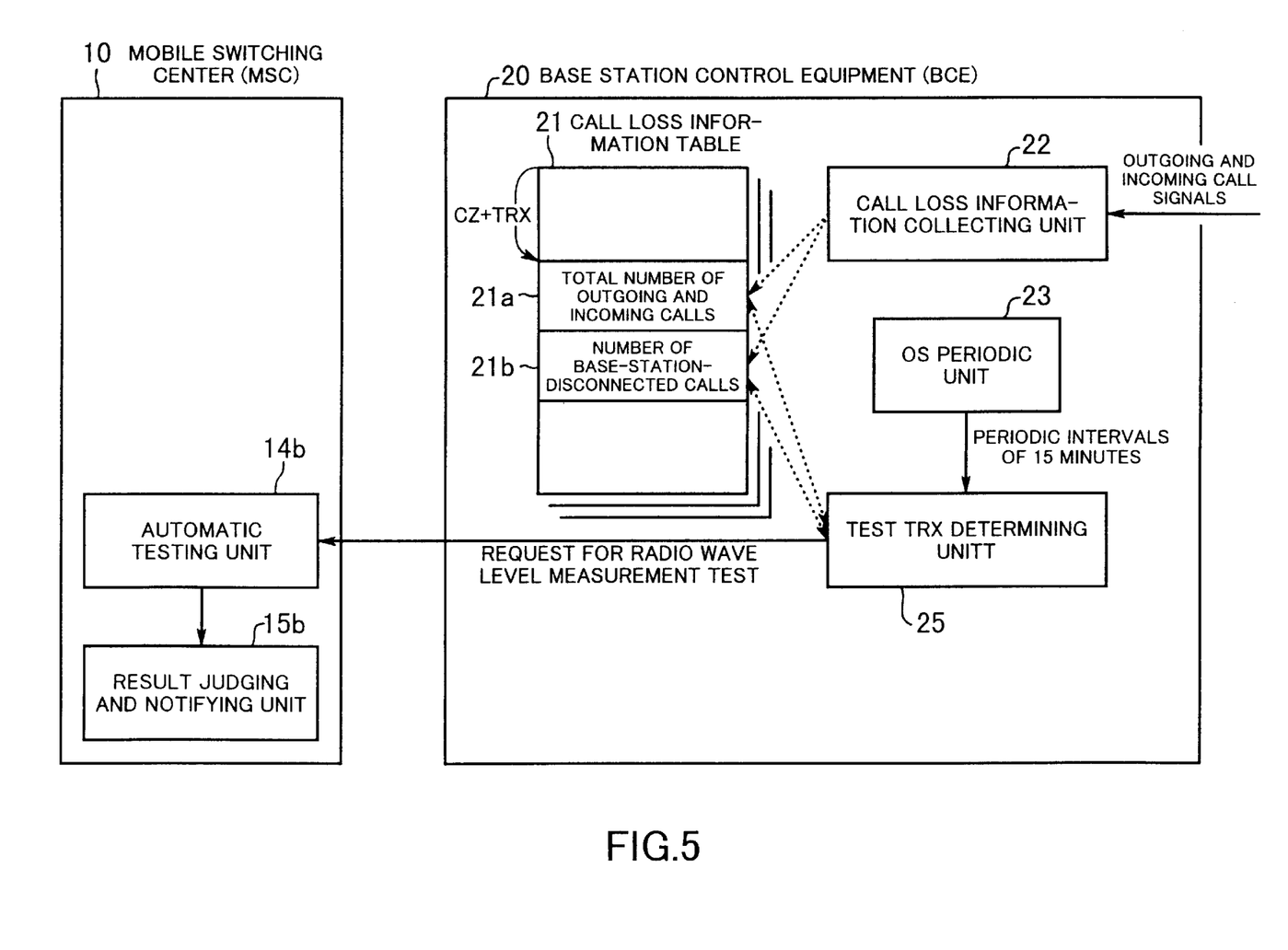
FIG. 5 is a block diagram of functions performed by the processing operation of a data processor of a mobile switching center and the processing operation of a data processor of a base station control equipment in a fault monitoring apparatus according to a third embodiment of the present invention.

FIG. 5 shows in block form functions performed by the processing operation of the data processor 10a of the mobile switching center 10 and the processing operation of the data processor of the base station control equipment 20 in the fault monitoring apparatus according to the third embodiment of the present invention. The processing operations according to the third embodiment are similar to those according to the second embodiment shown in FIG. 4. Therefore, those parts shown in FIG. 5 which are identical to those shown in FIG. 4 are denoted by identical reference characters, and will not be described below, and only those parts shown in FIG. 5 which are different from those shown in FIG. 4 will be described below.

According to the third embodiment, a test TRX determining unit 25 disposed in the base station control equipment 20 is started to operate by the OS periodic unit 23 at a periodic interval of 15 minutes, for example. When the test TRX determining unit 25 starts to operate, it reads data from all the memory areas of the call loss information table 21, and then updates all the memory areas with the value 0. Using the read data, the test TRX determining unit 25 calculates call loss probabilities in the respective transceivers of the base stations by dividing the values in columns 21b, which store data representing the numbers of base-station-disconnected calls, by the values in columns 21a, which store data representing the total numbers of outgoing and incoming calls, associated with the respective transceivers of the base stations.

The test TRX determining unit 25 compares the calculated call loss probabilities in the respective transceivers of the base stations with a predetermined reference value. If any one of the calculated call loss probabilities exceeds the predetermined reference value, then test TRX determining unit 25 designates the transceiver of the base station which is related to the excessive call loss probability, and starts to operate the automatic testing unit 14b.

The automatic testing unit 14b and the result judging and notifying unit 15b operate in the same manner as with the automatic testing unit 14b and the result judging and notifying unit 15b according to the second embodiment.

According to the third embodiment, the burden on the mobile switching center 10 for its processing operations is smaller than the burden on the mobile switching center 10 according to the first embodiment.

A fault monitoring apparatus according to a fourth embodiment of the present invention will be described below. The arrangement of the fault monitoring apparatus according to the fourth embodiment is basically similar to the arrangement of the fault monitoring apparatus according to the first embodiment shown in FIG. 2. Therefore, the description of the arrangement of the fault monitoring apparatus according to the first embodiment will be incorporated herein.

The processing operation of the data processor 10a of the mobile switching center 10 according to the fourth embodiment are different from that according to the first embodiment.

Figure 6:
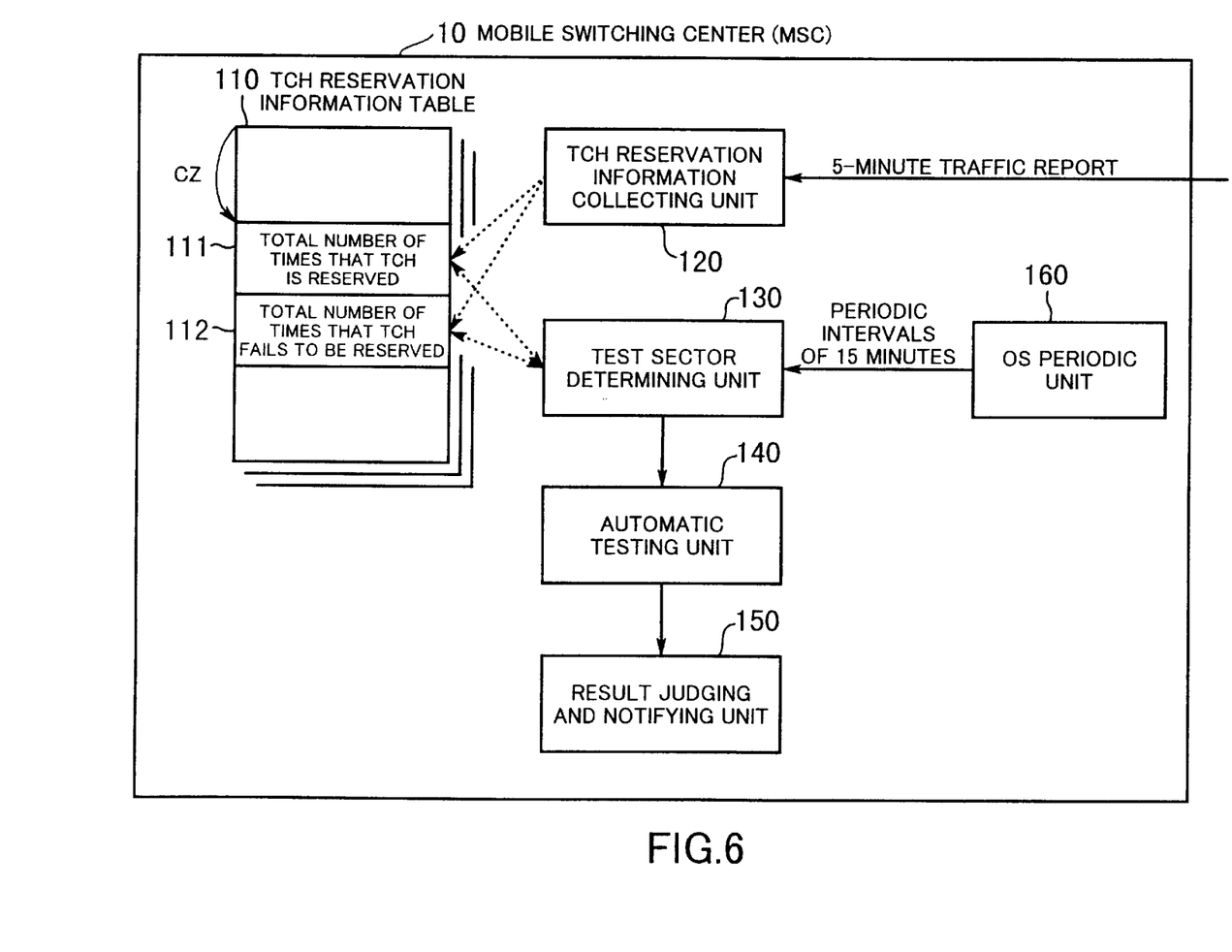
FIG. 6 is a block diagram of functions performed by the processing operation of a data processor of a mobile switching center in a fault monitoring apparatus according to a fourth embodiment of the present invention.

FIG. 6 shows in block form functions performed by the processing operation of the data processor 10a of the mobile switching center 10 in the fault monitoring apparatus according to the fourth embodiment of the present invention.

As shown in FIG. 6, a TCH reservation information table 110 has divided memory areas corresponding respectively to the base stations. Each of the memory areas includes divided memory areas associated respectively with radio zones (CZ) and each having a column 111 for storing data representing the total number of times that a traffic channel TCH is reserved and a column 112 for storing data representing the total number of times that a traffic channel TCH fails to be reserved.

According to the standards of RCR, the base station control equipment 20 transmits traffic information referred to as a "5-minute traffic report" to the mobile switching center 10 at every 5 minutes. The "5-minute traffic report" contains the number of times that a traffic channel (TCH) is reserved and the number of times that a traffic channel (TCH) fails to be reversed in 5 minutes, described in the sector of each base station.

Based on the "5-minute traffic report" transmitted from the station control equipment 20 to the mobile switching center 10, a TCH reservation information collecting unit 120 writes data into the TCH reservation information table 110. Specifically, the TCH reservation information collecting unit 120 reads the number of times that a traffic channel (TCH) is reserved from the "5-minute traffic report" in the sector of each base station, searches the TCH reservation information table 110 for a memory area corresponding to the base station and the sector, adds the read number to the value already stored in the column 111 in the memory area, and stores the sum into the TCH reservation information table 110. In the TCH reservation information table 110, the sector and the radio zone (CZ) have the same meaning.

Furthermore, the TCH reservation information collecting unit 120 reads the number of times that a traffic channel (TCH) fails to be reserved from the "5-minute traffic report" in the sector of each base station, searches the TCH reservation information table 110 for a memory area corresponding to the base station and the sector, adds the read number to the value already stored in the column 112 in the memory area, and stores the sum into the TCH reservation information table 110.

An OS periodic unit 160 starts to operate a test sector determining unit 130 at a periodic interval of 15 minutes, for example. When the test sector determining unit 130 starts to operate, it reads data from all the memory areas of the TCH reservation information table 110, and then updates all the memory areas with the value 0. As a result, the data read from the memory areas represents the accumulated numbers, over 15 minutes, of times that a traffic channel is reserved and times that a traffic channel fails to be reserved in the respective sectors of the base stations.

Using the read data, the test sector determining unit 130 calculates TCH reservation failure percentages in the sectors of the base stations by dividing the values in the columns 112 by the values in the columns 111 associated with the respective sectors of the base stations.

The test sector determining unit 130 compares the calculated TCH reservation failure percentages with a predetermined reference value. If any one of the calculated TCH reservation failure percentages exceeds the predetermined reference value, then the test sector determining unit 130 designates the sector of the base station which is related to the excessive TCH reservation failure percentage, and starts to operate an automatic testing unit 140. Therefore, the test sector determining unit 130 monitors the TCH reservation failure percentage of each of the sectors of the base stations at a periodic interval of 15 minutes, for example, and when the monitored TCH reservation failure percentage exceeds the predetermined reference value, the test sector determining unit 130 determines that a region related to the corresponding sector is possibly suffering a fault. It is assumed that a region related to the first sector of the base station 30 is possibly suffering a fault.

When the automatic testing unit 140 starts to operate, it issues a command to the controller 31p of the base station 30 in question to cause the transceivers of the designated sector and the test transceiver 33 to transmit and receive radio waves in respective channels of the transceivers via the radio transmission path. The automatic testing unit 140 also causes the transceivers of the first sector and the test transceiver 33 to measure received levels in the frequency bands of the respective channels and both frequency side bands adjacent to the frequency bands.

A result judging and notifying unit 150 receives the measured results and specifies a faulty location. Specifically, assuming that the transceiver 31a is included in the first sector of the base station 30, if the received level in the frequency band of a first channel of the transceiver 31a is equal to or lower than a first predetermined level, or the received levels in the both frequency side bands adjacent to the frequency band of the first channel are equal to or higher than a second predetermined level (much smaller than the first predetermined level), then the result judging and notifying unit 150 determines that a region related to the first channel in the transceiver 31a of the base station 30 is suffering a fault. The result judging and notifying unit 150 makes such a judgment with respect to each of the received levels measured by the transceivers of the first sector and the test transceiver 33, and also with respect to each of the channels.

If the result judging and notifying unit 150 determines the occurrence of a fault, then the result judging and notifying unit 150 notifies the maintenance personnel of the fault through the base station control equipment 20.

According to the fourth embodiment, since the occurrence of a fault is detected automatically, but not manually, the detection of the occurrence of a fault can immediately be carried out.

According to the fourth embodiment, furthermore, since the occurrence of a fault in a base station is detected on the basis of a TCH reservation failure percentage, a radio wave level measurement test is prevented from being carried out on cases which do not require such a test.

The TCH reservation failure percentage is also effective in monitoring the occurrence of a fault limited to regions related to radio circuits. According to the fourth embodiment, therefore, when a fault occurs, it can immediately be recognized as occurring in a radio circuit region, but not in a wired circuit region. Stated otherwise, it is possible to recognize faulty locations distinguished as belonging to radio circuit regions from the outset.

A fault monitoring apparatus according to a fifth embodiment of the present invention will be described below. The arrangement of the fault monitoring apparatus according to the fifth embodiment is basically similar to the arrangement of the fault monitoring apparatus according to the first embodiment shown in FIG. 2. Therefore, the description of the arrangement of the fault monitoring apparatus according to the first embodiment will be incorporated herein.

The processing operation of the data processor 10*a* of the mobile switching center 10 and the processing operation of the data processor of the base station control equipment 20 according to the fifth embodiment are different from those according to the first embodiment, but similar to those according to the fourth embodiment. The processing operations according to the fifth embodiment will be described below in comparison with those according to the fourth embodiment.

Figure 7:
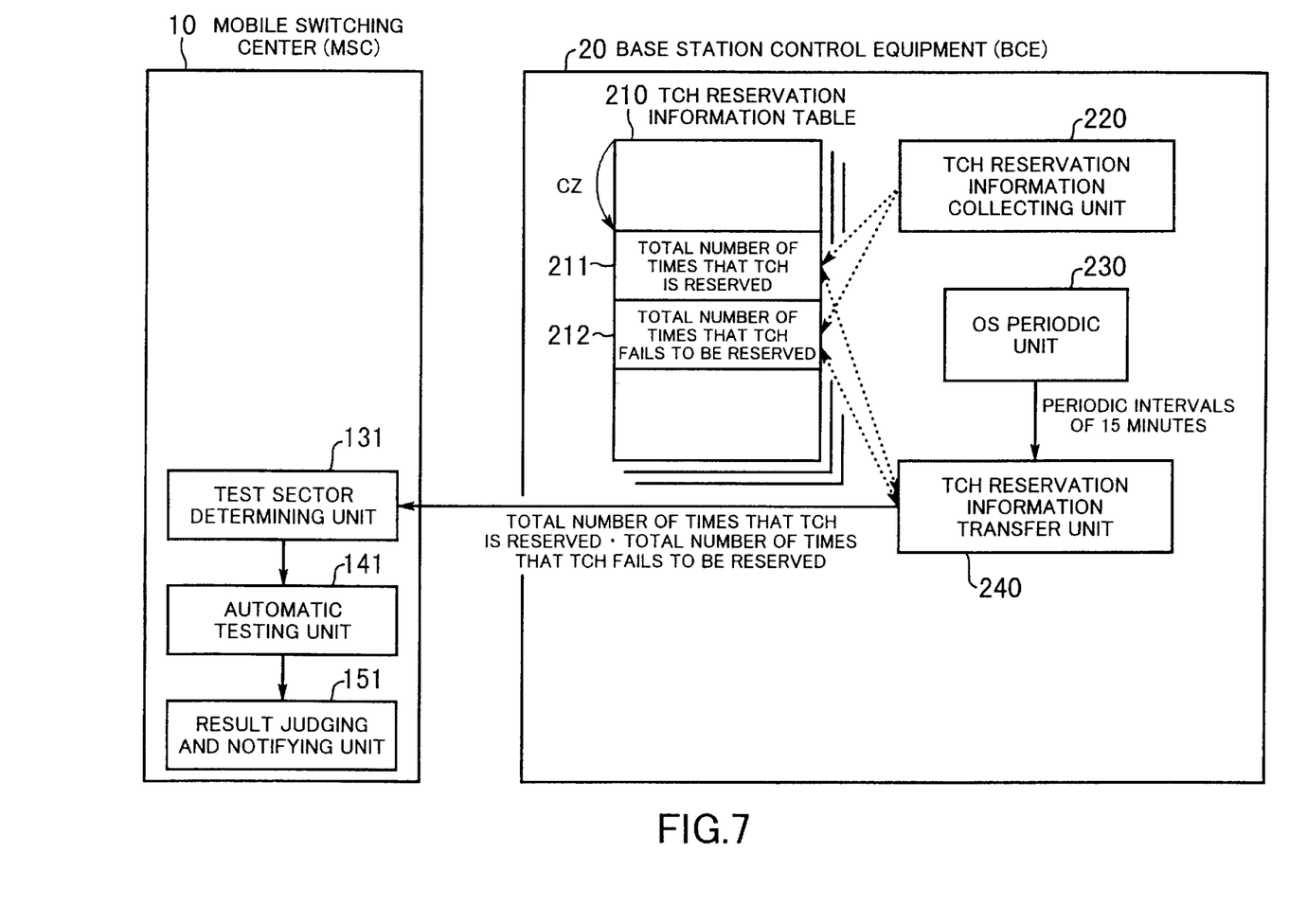
FIG. 7 is a block diagram of functions performed by the processing operation of a data processor of a mobile switching center and the processing operation of a data processor of a base station control equipment in a fault monitoring apparatus according to a fifth embodiment of the present invention.

FIG. 7 shows in block form functions performed by the processing operation of the data processor 10*a* of the mobile switching center 10 and the processing operation of the data processor of the base station control equipment 20 in the fault monitoring apparatus according to the fifth embodiment of the present invention.

In FIG. 7, a TCH reservation information table 210 is identical to the TCH reservation information table 110 according to the fourth embodiment shown in FIG. 6 except that the TCH reservation information table 210 is disposed in the base station control equipment 20, and a TCH reservation information collecting unit 220 operates in the same manner as the TCH reservation information collecting unit 120 according to the fourth embodiment except that the TCH reservation information collecting unit 220 is disposed in the base station control equipment 20. Therefore, the TCH reservation information table 210 and the TCH reservation information collecting unit 220 will not be described in detail below.

In the base station control equipment 20, an OS periodic unit 230 starts to operate a TCH reservation information transfer unit 240 at a periodic interval of 15 minutes, for example. When the TCH reservation information transfer unit 240 starts to operate, it reads data from all the memory areas of the TCH reservation information table 210, and then updates all the memory areas with the value 0. As a result, the data read from the memory areas represents the accumulated numbers, over 15 minutes, of times that a traffic channel is reserved and times that a traffic channel fails to be reserved in the respective sectors of the base stations.

The TCH reservation information transfer unit 240 transfers the read accumulated numbers to a test sector determining unit 131 in the mobile switching center 10.

Using the transferred accumulated numbers, the test sector determining unit 131 calculates TCH reservation failure percentages in the sectors of the base stations. The test sector determining unit 131 calculates the TCH reservation failure percentages and carries out a subsequent comparing and determining process to start to operate an automatic testing unit 141 in the same manner as with the test sector determining unit 130 according to the fourth embodiment.

The automatic testing unit 141 and a result judging and notifying unit 151 operate in the same manner as with the automatic testing unit 140 and the result judging and notifying unit 150 according to the fourth embodiment.

According to the fifth embodiment, the burden on the mobile switching center 10 for its processing operations is smaller than the burden on the mobile switching center 10 according to the fourth embodiment.

A fault monitoring apparatus according to a sixth embodiment of the present invention will be described below. The arrangement of the fault monitoring apparatus according to the sixth embodiment is basically similar to the arrangement of the fault monitoring apparatus according to the first embodiment shown in FIG. 2. Therefore, the description of the arrangement of the fault monitoring apparatus according to the first embodiment will be incorporated herein.

The processing operation of the data processor 10*a* of the mobile switching center 10 and the processing operation of the data processor of the base station control equipment 20 according to the sixth embodiment are different from those according to the first embodiment.

Figure 8:
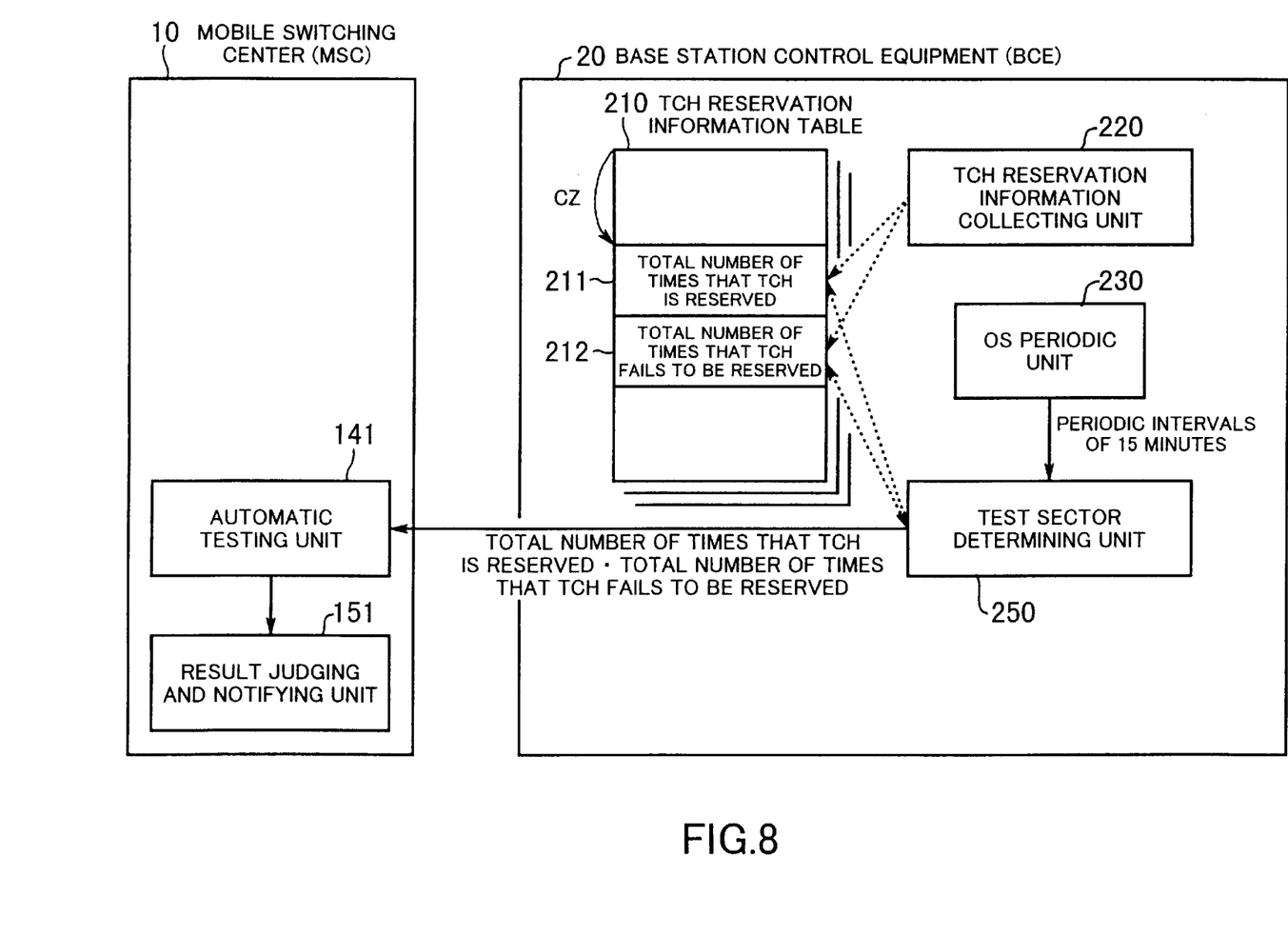
FIG. 8 is a block diagram of functions performed by the processing operation of a data processor of a mobile switching center and the processing operation of a data processor of a base station control equipment in a fault monitoring apparatus according to a sixth embodiment of the present invention.

FIG. 8 shows in block form functions performed by the processing operation of the data processor 10*a* of the mobile switching center 10 and the processing operation of the data processor of the base station control equipment 20 in the fault monitoring apparatus according to the sixth embodiment of the present invention. The processing operations according to the sixth embodiment are similar to those according to the fifth embodiment shown in FIG. 7. Therefore, those parts shown in FIG. 8 which are identical to those shown in FIG. 7 are denoted by identical reference characters, and will not be described below, and only those parts shown in FIG. 8 which are different from those shown in FIG. 7 will be described below.

According to the sixth embodiment, a test sector determining unit 250 disposed in the base station control equipment 20 is started to operate by the OS periodic unit 230 at a periodic interval of 15 minutes, for example. When the test sector determining unit 250 starts to operate, it reads data from all the memory areas of the TCH reservation information table 210, and then updates all the memory areas with the value 0. Using the read data, the test sector determining unit 250 calculates TCH reservation failure percentages in the respective sectors of the base stations by dividing the values in the columns 212 by the values in the columns 211 associated with the respective sectors of the base stations.

The test sector determining unit 250 compares the calculated TCH reservation failure percentages with a predetermined reference value. If any one of the calculated TCH reservation failure percentages exceeds the predetermined reference value, then the test sector determining unit 250 designates the sector of the base station which is related to the excessive TCH reservation failure percentage, and starts to operate the automatic testing unit 141 in the mobile switching center 10.

The automatic testing unit 141 and the result judging and notifying unit 151 operate in the same manner as with the automatic testing unit 141 and the result judging and notifying unit 151 according to the fifth embodiment.

According to the sixth embodiment, the burden on the mobile switching center 10 for its processing operations is smaller than the burden on the mobile switching center 10 according to the fourth embodiment.

According to the present invention, inasmuch as the occurrence of a fault is detected automatically, but not manually, the detection of the occurrence of a fault can immediately be carried out.

Furthermore, since the occurrence of a fault in a base station is detected on the basis of a call loss probability, a radio wave level measurement test is prevented from being carried out on cases which do not require such a test.

Alternatively, because the occurrence of a fault in a base station is detected on the basis of a TCH reservation failure percentage, a radio wave level measurement test is prevented from being carried out on cases which do not require such a test.

The TCH reservation failure percentage is also effective in monitoring the occurrence of a fault limited to regions related to radio circuits. Therefore, if the occurrence of a fault in a base station is detected on the basis of a TCH reservation failure percentage, then when a fault occurs, it can immediately be recognized as occurring in a radio circuit region, but not in a wired circuit region. Stated otherwise, it is possible to recognize faulty locations distinguished as belonging to radio circuit regions from the outset.

The fault monitoring apparatus according to the present invention may be disposed not only in a mobile switching center, but also partly in a base station control equipment. With this arrangement, the burden on the mobile switching center for its processing operations may be reduced, and the mobile switching center may be designed with increased freedom.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A fault monitoring apparatus for a mobile communication system having a plurality of base stations, a mobile switching center, and a base station control equipment, comprising:

a call loss information table disposed in the mobile switching center and having a plurality of memory areas corresponding respectively to a plurality of components of the base stations;

call loss information collecting means disposed in the mobile switching center, for detecting the numbers of outgoing and incoming calls and the numbers of base-station-disconnected calls in the respective components based on outgoing and incoming call signals sent from the base stations, and accumulating and storing the detected numbers in the corresponding memory areas of said call loss information table;

test region determining means disposed in the mobile switching center, for calculating call loss probabilities in the respective components based on the accumulated numbers of outgoing and incoming calls and the accumulated numbers of base-station-disconnected calls, which have been stored in said call loss information table, and specifying a component of the base stations which is to be automatically tested for fault detection, based on the calculated call loss probabilities;

automatic testing means disposed in the mobile switching center, for automatically testing the component of the base stations which has been specified by said test region determining means, for fault detection; and result judging and notifying means disposed in the mobile switching center, for judging whether there is a fault or not based on a test result produced by said automatic testing means, and notifying maintenance personnel of a faulty location if there is a fault as judged by said result judging and notifying means.

2. A fault monitoring apparatus according to claim 1, wherein said components of the base stations comprise a plurality of transceivers of the base stations.

3. A fault monitoring apparatus according to claim 1, wherein the numbers of outgoing and incoming calls detected by said call loss information collecting means comprise the numbers of received outgoing radio status report messages and received incoming radio status report messages which are contained in said outgoing and incoming call signals.

4. A fault monitoring apparatus according to claim 1, wherein the numbers of base-station-disconnected calls detected by said call loss information collecting means comprise the numbers of received call disconnected event messages which carry reasons for base-station-disconnected calls, among call disconnected event messages which are contained in said outgoing and incoming call signals.

5. A fault monitoring apparatus according to claim 1, wherein said call loss probabilities calculated by said test region determining means have respective values produced by dividing the accumulated numbers, over a predetermined period of time, of base-station-disconnected calls by the accumulated numbers, over said predetermined period of time, of outgoing and incoming calls in the respective components of the base stations.

6. A fault monitoring apparatus according to claim 1, wherein said test region determining means includes specifying means for specifying the component of the base stations which is to be automatically tested for fault detection if any one of the calculated call loss probabilities exceeds a predetermined reference value.

7. A fault monitoring apparatus according to claim 1, further comprising:

OS periodic means disposed in said mobile switching center, for starting to operate said test region determining means at predetermined periodic intervals.

8. A fault monitoring apparatus according to claim 7, wherein said test region determining means comprises:

calculating means operable by said OS periodic means, for reading the accumulated numbers of outgoing and incoming calls and the accumulated numbers of base-station-disconnected calls from said call loss information table, and calculating call loss probabilities in the respective components of the base stations;

clearing means for clearing the data stored in said call loss information table after the accumulated numbers have been read from said call loss information table by said calculating means; and specifying means for specifying the component of the base stations which is to be automatically tested for fault detection based on the call loss probabilities calculated by said calculating means.

9. A fault monitoring apparatus according to claim 1, wherein each of said base stations has a test transceiver, said automatic testing means comprising:

transmission and reception instructing means for transmitting and receiving radio waves in channels via a radio transmission path between the component of the base stations which is specified by said test region determining means and said test transceiver; and measurement instructing means for instructing said component of the base stations and said test transceiver to measure received levels in frequency bands of the channels and adjacent frequency bands, when the radio waves are transmitted and received between said component of the base stations and said test transceiver.

10. A fault monitoring apparatus according to claim 9, wherein said result judging and notifying means includes judging means for determining that a region related to a channel is suffering a fault if the received level in said channel measured as instructed by said measurement instructing means is at most a first predetermined level in the frequency band of said channel or at least a second predetermined level in a frequency band adjacent to the frequency band of said channel.

11. A fault monitoring apparatus for a mobile communication system having a plurality of base stations, a mobile switching center, and a base station control equipment, comprising:

a call loss information table disposed in the base station control equipment and having a plurality of memory areas corresponding respectively to a plurality of components of the base stations;

call loss information collecting means disposed in the base station control equipment, for detecting the numbers of outgoing and incoming calls and the numbers of base-station-disconnected calls in the respective components based on outgoing and incoming call signals sent from the base stations, and accumulating and storing the detected numbers in the corresponding memory areas of said call loss information table;

call loss information transfer means disposed in the base station control equipment, for reading the stored accumulated numbers of outgoing and incoming calls and the stored accumulated numbers of base-station-disconnected calls from said call loss information table, and transferring the read accumulated numbers to the mobile switching center;

test region determining means disposed in the mobile switching center, for calculating call loss probabilities in the respective components based on the accumulated numbers of outgoing and incoming calls and the accumulated numbers of base-station-disconnected calls, which have been transferred by said call loss information transfer means, and specifying a component of the base stations which is to be automatically tested for fault detection, based on the calculated call loss probabilities;

automatic testing means disposed in the mobile switching center, for automatically testing the component of the base stations which has been specified by said test region determining means, for fault detection; and result judging and notifying means disposed in the mobile switching center, for judging whether there is a fault or not based on a test result produced by said automatic testing means, and notifying maintenance personnel of a faulty location if there is a fault as judged by said result judging and notifying means.

12. A fault monitoring apparatus according to claim 11, further comprising:

OS periodic means disposed in said base station control equipment, for starting to operate said call loss information transfer means at predetermined periodic intervals.

13. A fault monitoring apparatus according to claim 12, wherein said call loss information transfer means comprises:

transfer means operable by said OS periodic means, for reading the accumulated numbers of outgoing and incoming calls and the accumulated numbers of base-station-disconnected calls from said call loss information table, and transferring the read accumulated numbers to said test region determining means; and clearing means for clearing the data stored in said call loss information table after the accumulated numbers have been read from said call loss information table by said transfer means.

14. A fault monitoring apparatus for a mobile communication system having a plurality of base stations, a mobile switching center, and a base station control equipment, comprising:

a call loss information table disposed in the base station control equipment and having a plurality of memory areas corresponding respectively to a plurality of components of the base stations;

call loss information collecting means disposed in the base station control equipment, for detecting the numbers of outgoing and incoming calls and the numbers of base-station-disconnected calls in the respective components based on outgoing and incoming call signals sent from the base stations, and accumulating and storing the detected numbers in the corresponding memory areas of said call loss information table;

test region determining means disposed in the base station control equipment, for calculating call loss probabilities in the respective components based on the accumulated numbers of outgoing and incoming calls and the accumulated numbers of base-station-disconnected calls, which have been transferred by said call loss information transfer means, specifying a component of the base stations which is to be automatically tested for fault detection, based on the calculated call loss probabilities, and transmitting information about the specified component to the mobile switching center;

automatic testing means disposed in the mobile switching center, for automatically testing the component of the base stations which has been specified by said test region determining means, for fault detection; and result judging and notifying means disposed in the mobile switching center, for judging whether there is a fault or not based on a test result produced by said automatic testing means, and notifying maintenance personnel of a faulty location if there is a fault as judged by said result judging and notifying means.

15. A fault monitoring apparatus for a mobile communication system having a plurality of base stations, a mobile switching center, and a base station control equipment, comprising:

a TCH reservation information table disposed in the mobile switching center and having a plurality of memory areas corresponding respectively to a plurality of components of the base stations;

TCH reservation information collecting means disposed in the mobile switching center, for detecting the numbers of times that a TCH is reserved and the numbers of times that a TCH fails to be reserved in the respective components based on predetermined traffic information sent from the base station control equipment, and accumulating and storing the detected numbers in the corresponding memory areas of said TCH reservation information table;

test region determining means disposed in the mobile switching center, for calculating TCH reservation failure percentages in the respective components based on the accumulated numbers of times that a TCH is reserved and the accumulated numbers of times that a TCH fails to be reserved, which have been stored in said TCH reservation information table, and specifying a component of the base stations which is to be automatically tested for fault detection, based on the calculated TCH reservation failure percentages;

automatic testing means disposed in the mobile switching center, for automatically testing the component of the base stations which has been specified by said test region determining means, for fault detection; and result judging and notifying means disposed in the mobile switching center, for judging whether there is a fault or not based on a test result produced by said automatic testing means, and notifying maintenance personnel of a faulty location if there is a fault as judged by said result judging and notifying means.

16. A fault monitoring apparatus according to claim 15, wherein said components of the base stations comprise a plurality of transceivers corresponding respectively to radio zones covered respectively by said base stations.

17. A fault monitoring apparatus according to claim 15, wherein said predetermined traffic information comprises information represented by a "5-minute traffic report" prescribed by standards of RCR.

18. A fault monitoring apparatus according to claim 15, wherein said TCH reservation failure percentages calculated by said test region determining means have respective values produced by dividing the accumulated numbers, over a predetermined period of time, of times that a TCH fails to be reserved by the accumulated numbers, over said predetermined period of time, of times that a TCH is reserved in the respective components of the base stations.

19. A fault monitoring apparatus according to claim 15, wherein said test region determining means includes specifying means for specifying the component of the base stations which is to be automatically tested for fault detection if any one of the TCH reservation failure percentages exceeds a predetermined reference value.

20. A fault monitoring apparatus according to claim 15, further comprising:

Os periodic means disposed in said mobile switching center, for starting to operate said test region determining means at predetermined periodic intervals.

21. A fault monitoring apparatus according to claim 20, wherein said test region determining means comprises:

calculating means operable by said OS periodic means, for reading the accumulated numbers of times that a TCH is reserved and the accumulated numbers of times that a TCH fails to be reserved from said TCH reservation information table, and calculating TCH reservation failure percentages in the respective components of the base stations;

clearing means for clearing the data stored in said TCH reservation information table after the accumulated numbers have been read from said TCH reservation information table by said calculating means; and specifying means for specifying the component of the base stations which is to be automatically tested for fault detection based on the TCH reservation failure percentages calculated by said calculating means.

22. A fault monitoring apparatus according to claim 15, wherein each of said base stations has a test transceiver, said automatic testing means comprising:

transmission and reception instructing means for transmitting and receiving radio waves in channels via a radio transmission path between the component of the base stations which is specified by said test region determining means and said test transceiver; and measurement instructing means for instructing said component of the base stations and said test transceiver to measure received levels in frequency bands of the channels and adjacent frequency bands, when the radio waves are transmitted and received between said component of the base stations and said test transceiver.

23. A fault monitoring apparatus according to claim 22, wherein said result judging and notifying means includes judging means for determining that a region related to a channel is suffering a fault if the received level in said channel measured as instructed by said measurement instructing means is at most a first predetermined level in the frequency band of said channel or at least a second predetermined level in a frequency band adjacent to the frequency band of said channel.

24. A fault monitoring apparatus for a mobile communication system having a plurality of base stations, a mobile switching center, and a base station control equipment, comprising:

a TCH reservation information table disposed in the base station control equipment and having a plurality of memory areas corresponding respectively to a plurality of components of the base stations;

TCH reservation information collecting means disposed in the base station control equipment, for detecting the numbers of times that a TCH is reserved and the numbers of times that a TCH fails to be reserved in the respective components based on predetermined traffic information generated on its own, and accumulating and storing the detected numbers in the corresponding memory areas of said TCH reservation information table;

TCH reservation information transfer means disposed in the base station control equipment, for reading the stored accumulated numbers of times that a TCH is reserved and the stored accumulated numbers of times that a TCH fails to be reserved from said TCH reservation information table, and transferring the read accumulated numbers to the mobile switching center;

test region determining means disposed in the mobile switching center, for calculating TCH reservation failure percentages in the respective components based on the accumulated numbers of times that a TCH is reserved and the accumulated numbers of times that a TCH fails to be reserved, which have been transferred by said TCH reservation information transfer means, and specifying a component of the base stations which is to be automatically tested for fault detection, based on the calculated TCH reservation failure percentages;

automatic testing means disposed in the mobile switching center, for automatically testing the component of the base stations which has been specified by said test region determining means, for fault detection; and result judging and notifying means disposed in the mobile switching center for judging whether there is a fault or not based on a test result produced by said automatic testing means, and notifying maintenance personnel of a faulty location if there is a fault as judged by said result judging and notifying means.

25. A fault monitoring apparatus according to claim 24, further comprising:

OS periodic means disposed in said base station control equipment, for starting to operate said TCH reservation information transfer means at predetermined periodic intervals.

26. A fault monitoring apparatus according to claim 25, wherein said TCH reservation information transfer means comprises:

transfer means operable by said OS periodic means, for reading the accumulated numbers of times that a TCH is reserved and the accumulated numbers of times that a TCH fails to be reserved from said TCH reservation information table, and transferring the read accumulated numbers to said test region determining means; and clearing means for clearing the data stored in said TCH reservation information table after the accumulated numbers have been read from said TCH reservation information table by said transfer means.

27. A fault monitoring apparatus for a mobile communication system having a plurality of base stations, a mobile switching center, and a base station control equipment, comprising:

a TCH reservation information table disposed in the base station control equipment and having a plurality of memory areas corresponding respectively to a plurality of components of the base stations;

TCH reservation information collecting means disposed in the base station control equipment, for detecting the numbers of times that a TCH is reserved and the numbers of times that a TCH fails to be reserved in the respective components based on predetermined traffic information generated on its own, and accumulating and storing the detected numbers in the corresponding memory areas of said TCH reservation information table;

test region determining means disposed in the base station control equipment, for calculating TCH reservation failure percentages in the respective components based on the accumulated numbers of times that a TCH is reserved and the accumulated numbers of times that a TCH fails to be reserved, which have been stored in said TCH reservation information table, specifying a component of the base stations which is to be automatically tested for fault detection, based on the calculated TCH reservation failure percentages, and transmitting information about the specified component to the mobile switching center;

automatic testing means disposed in the mobile switching center, for automatically testing the component of the base stations which has been specified by said test region determining means, for fault detection; and result judging and notifying means disposed in the mobile switching center, for judging whether there is a fault or not based on a test result produced by said automatic testing means, and notifying maintenance personnel of a faulty location if there is a fault as judged by said result judging and notifying means.

* * * * *